(12) United States Patent
Kleiner et al.

(10) Patent No.: US 6,839,519 B1
(45) Date of Patent: Jan. 4, 2005

(54) LASER CROSSLINK METHODS AND APPARATUS

(75) Inventors: Norbert Kleiner, Scottsdale, AZ (US); Douglas Roy Tomren, Scottsdale, AZ (US); Davis Howard Hartman, Scottsdale, AZ (US); Keith Vaclav Warble, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 609 days.

(21) Appl. No.: 09/675,629

(22) Filed: Sep. 29, 2000

(51) Int. Cl.[7] .............................................. H04B 10/00
(52) U.S. Cl. ..................... 398/121; 398/124; 356/141.2
(58) Field of Search ........................ 398/118, 121–125; 356/140, 141.1–141.2

(56) References Cited

U.S. PATENT DOCUMENTS

| | | | | |
|---|---|---|---|---|
| 4,625,108 A | * | 11/1986 | Nestel et al. | 250/227.11 |
| 4,880,305 A | * | 11/1989 | Salt | 356/141.3 |
| 5,142,400 A | * | 8/1992 | Solinsky | 398/129 |
| 5,218,467 A | * | 6/1993 | Ross et al. | 398/124 |
| 5,923,452 A | * | 7/1999 | Carlson | 398/123 |
| 2003/0016348 A1 | * | 1/2003 | Sallee | 356/141.1 |

OTHER PUBLICATIONS

An article entitled "Progress On The Development Of The Optical Communications Demonstrator", by Tsun–Yee Yan, Muthu Jeganathan and James R. Lesh, California Institute of Technology from Free Space Laser Communication Technologies IX, 1997 SPIE vol. 2990.

An article entitled "Laser Crosslink Subsystem—An Overview", by R.B. Deadrick and W.F. Deckelman, McDonnell Douglas Electronic Systems Company, from SPIE vol. 1635 Free–Space Laser Communication Technologies IV(1992)/225.

* cited by examiner

*Primary Examiner*—Kinfe-Michael Negash
(74) *Attorney, Agent, or Firm*—Frank J. Bogacz

(57) ABSTRACT

A laser crosslink apparatus includes an optical device (212, FIG. 5), a beam splitter (512), an acquisition channel and a tracking and communication channel. The acquisition channel includes a high density optical fiber bundle and an acquisition channel device (510). The optical device (212) receives laser light from a wide field of view, and the beam splitter (512) splits the light into the two channels. The high density optical fiber bundle (204) has one end (206) in a focal plane of the optical device, and another end (208) coupled to the acquisition channel device (510). The acquisition channel device (510) includes an optical receiver array (400, FIG. 4). The location of spot footprints on the optical receiver array determines the direction from which the laser light is received within the wide field of view. The optical fiber bundle allows the optical receiver array to be located away from the optical device, near the receiving/tracking system, where it can be more easily shielded from the harmful effects of space.

14 Claims, 4 Drawing Sheets

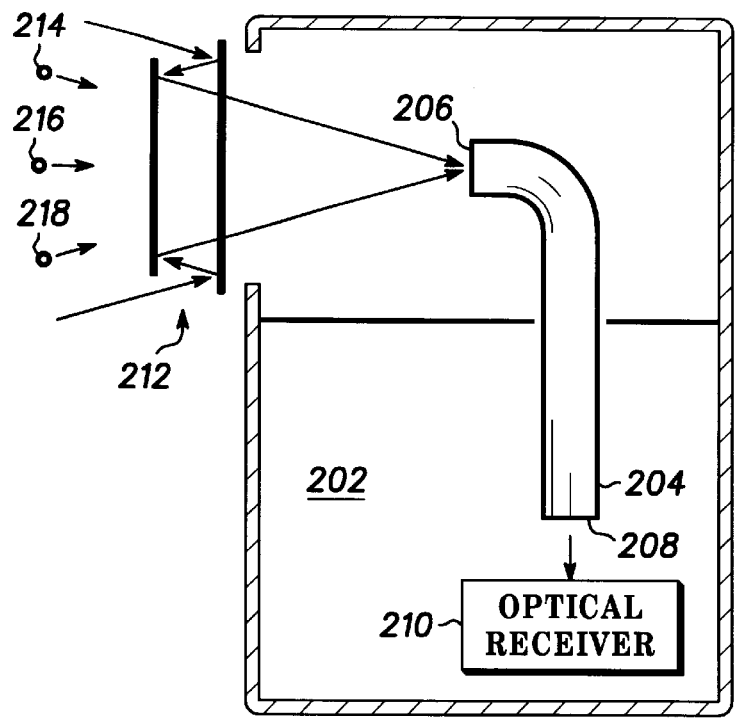
*FIG. 2*
200
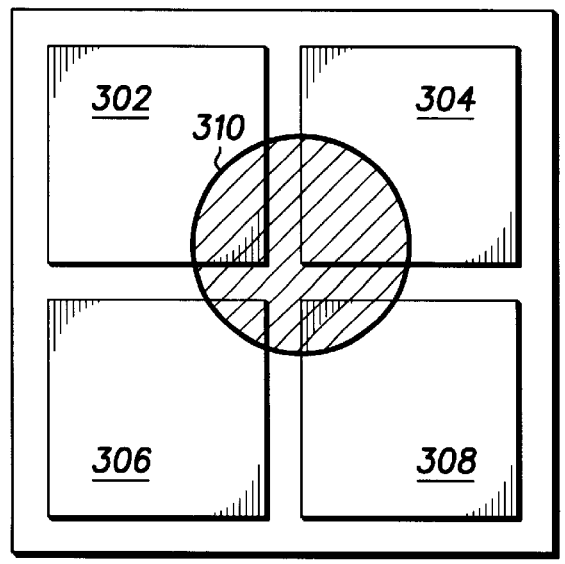
300 *FIG. 3*

LASER CROSSLINK METHODS AND APPARATUS

FIELD OF THE INVENTION

The present invention relates generally to satellite crosslinks and, in particular, to satellite crosslinks using lasers.

BACKGROUND OF THE INVENTION

Many modern satellite systems include multiple satellites that communicate with each other in space. The communications link between the satellites is called a "crosslink." Crosslinks can be implemented in many ways, including using radio frequency (RF) signals, or laser light. RF crosslinks can have wide beamwidths that provide for relatively easy signal acquisition and tracking, but the wide beamwidths also allow for relatively easy intercept. Laser crosslinks, on the other hand, have very narrow beams which protect against signal intercept, but increase the difficulty of signal acquisition and tracking.

Conventional laser crosslinks utilize optical devices to receive the laser light and to focus the laser light on one or more detectors in the focal plane of the optical devices. The optical devices are typically exposed to open space so that they can receive the laser light. The detectors are also exposed to space inasmuch as the location of the focal plane requires it.

Space presents a radiation and electromagnetic interference environment that is harsh on electronics, and laser light detectors typically include electronics that are particularly sensitive to radiation and electromagnetic interference. Shielding the detectors is difficult, in part because they are maintained in the focal plane of the exposed optical devices, and producing radiation-hardened detectors can be expensive.

Accordingly, a significant need exists for methods and apparatus for providing inexpensive, yet robust, laser crosslinks.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and wherein:

FIG. 2 shows a laser crosslink apparatus in accordance with a preferred embodiment of the present invention;

FIG. 3 shows a quadrant detector in accordance with a preferred embodiment of the present invention.

DETAILED DESCRIPTION OF THE DRAWINGS

In the following detailed description, reference is made to the accompanying drawings that show, by way of illustration, specific embodiments in which the invention may be practiced. It is to be understood that other embodiments may be utilized and structural changes may be made without departing from the scope of the present invention.

The methods and apparatus of the present invention provide an efficient mechanism to support laser crosslinks. A high-density optical fiber bundle provides a laser light transmission path between optical devices and an array of laser light detector devices. The optical devices are exposed to the harsh radiation environment of space, but the laser light detector devices are within an electromagnetically shielded portion of the satellite. One end of the fiber bundle is in the focal plane of the optical devices, and receives laser light from a wide field of view. The laser light is coupled to one or more of the optical fibers as a function of the direction from which the light is received. The other end of the fiber bundle is positioned near the detector devices such that the laser light illuminates one or more detector devices in an array. The optical fiber bundle preserves the physical relationship between fibers from one end to the other, so that the image focused onto the focal plane by the optical devices is substantially preserved at the detector array. The detector(s) that are illuminated determines the direction from which the laser light is received.

Figure 1:
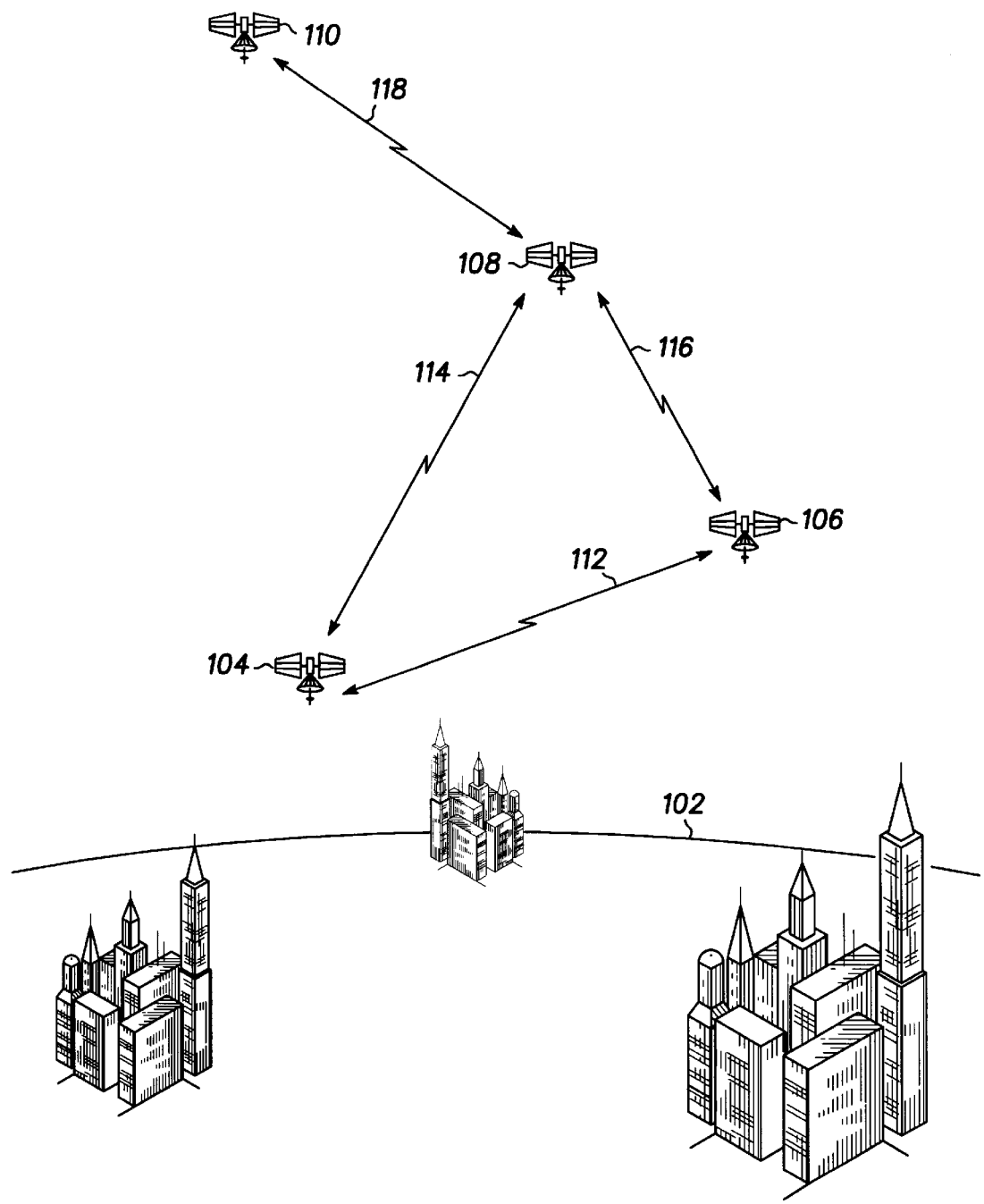
FIG. 1 shows a diagram of a satellite system in accordance with a preferred embodiment of the present invention.

Turning now to the drawings in which like reference characters indicate corresponding elements throughout the several views, attention is first directed to FIG. 1. FIG. 1 shows a diagram of a satellite system in accordance with a preferred embodiment of the present invention. Satellite system 100 is shown including satellites 104, 106, 108, and 110 orbiting earth 102. Each of the satellites communicates with various other satellites on crosslinks 112, 114, 116, and 118. Satellites 104 and 106 are Low Earth Orbit (LEO) satellites, and satellites 108 and 110 are geosynchronous orbit (GEO) satellites. Although the methods and apparatus of the present invention are described with reference to the LEO and GEO satellites as shown in FIG. 1, this is not a limitation of the present invention. For example, the methods and apparatus of the present invention can be advantageously utilized on medium earth orbit (MEO) satellites, high earth orbit (HEO) satellites, and satellites in other types of orbits, such as elliptical orbits.

In addition, the methods and apparatus can be advantageously utilized on space vehicles not in earth orbit. For example, deep space probes having laser communications capabilities can benefit from the methods and apparatus of the present invention.

Crosslinks 112, 114, 116, and 118 are laser crosslinks. As previously described, laser crosslinks are characterized by their narrow beamwidth. When a receiving satellite is illuminated by a laser on a crosslink from a sending satellite, in order to return the communications, the receiving satellite aims a return laser at the sending satellite. This presents many technical challenges, two of which are: 1) the determination of the angle, or "direction," of the sending satellite relative to the receiving satellite; and 2) the "steering" of the laser beams within the communications channels so that reliable communications can take place. For example, GEO satellite 108 is shown with three laser crosslinks. Crosslink 118 is with another GEO satellite, and crosslinks 114 and 116 are with LEO satellites 104 and 106, respectively. As the satellites move with respect to each other, satellite 118 tracks the location of the other satellites within a wide field of view, and it maintains its own laser(s) pointed at the other satellites as they change location.

FIG. 2 shows a laser crosslink apparatus in accordance with a preferred embodiment of the present invention. Laser crosslink apparatus 200 includes optical device 212, high-density optical fiber bundle 204, and optical receiver array 210. Optical device 212 can be any type of lens, telescope, or other optical apparatus capable of receiving light and focusing it onto a focal plane. Optical device 212 receives laser light from point sources within a wide field of view and focuses the laser light onto end 206 of fiber bundle 204. End 206 of fiber bundle 204 is preferably located at a focal plane of optical device 212 such that light received is efficiently transferred to fiber bundle 204.

Fiber bundle 204 is a high-density bundle of optical fibers having a large number of individual fibers. In a preferred embodiment, fiber bundle 110 is a fiber bundle commonly used in medical imaging applications, having on the order of 20,000 fibers, and it is commercially available from Schott Glass, for example. Fiber bundle 204 can be any length, and it includes a first end 206 and a second end 208. End 206 of fiber bundle 204 is coupled to optical device 212, and end 208 is coupled to optical receiver array 210, such that laser light from each of point sources 214, 216, and 218 is transmitted through fiber bundle 204 to optical receiver array 210.

Fibers within fiber bundle 204 are preferably arranged such that the relative placement of fibers along the length of fiber bundle 204 does not substantially change. In other words, the cross section of fibers is the same along the length of fiber bundle 204. For example, the fibers in a cross section of fibers exposed at end 206 have a placement relative to each other. In an embodiment where the relative placement does not change along the length of fiber bundle 204, fibers exposed at a cross section of fiber bundle 204 at end 208 have substantially the same placement relative to each other.

Optical receiver array 210 includes optical receivers (not shown), and in a preferred embodiment, the optical receivers include photodiodes capable of detecting laser light, and the optical receivers further include amplifiers to generate signals from the light. In one embodiment, optical receiver array 210 is a quadrant detector, and in another embodiment, optical receiver array 210 is a larger array of optical receivers.

Point sources 214, 216, and 218 can correspond to satellites in a wide field of view. For example, when laser crosslink apparatus 200 is included in satellite 108 (FIG. 1), point sources 214, 216, and 218 can correspond to satellites 104, 106, and 110. The directions of point sources 214, 216, and 218 can be determined by which optical receivers are illuminated within optical receiver array 210.

In one embodiment, laser crosslink apparatus 200 utilizes low gain, wide field of view telescopes with multiple laser source identification and tracking employing algorithms that apply information from pixels on a charge coupled device (CCD) array. The relative spatial location of illuminated pixels in the CCD array is used by algorithms to predict the location of the laser sources in the far field. In another embodiment, laser crosslink apparatus 200 utilizes high gain, narrow field of view telescopes with multiple pixels: flooded by a single laser source. The centroid of laser illumination on multiple pixels in the CCD array can then be used by algorithms to predict the location of the single laser source within the far field.

Fiber bundle 204 allows optical device 212 to be exposed to free space and the associated radiation environment, while optical receiver array 210 can be enclosed within electromagnetically shielded portion 202. Because fiber bundle 204 preserves the image from the focal plane of optical device 212 and projects the image on optical receiver array 210 in a remote location, optical receiver array 210 can be shielded from the harmful radiation of space.

FIG. 3 shows a quadrant detector in accordance with a preferred embodiment of the present invention. Quadrant detector 300 is shown having four optical receivers 302, 304, 306, and 308. Superimposed thereon is a point source footprint 310. In one embodiment, point source footprint 310 corresponds to a point source in a wide field of view, such as one of point sources 214, 216, or 218 (FIG. 2). In another embodiment, point source footprint 310 corresponds to a point source in a narrow field of view. When one of optical receivers 302, 304, 306, and 308 receives more laser light than the others, then the laser crosslink apparatus can determine which direction the point source is offset from the center. When all four optical receivers receive substantially the same amount of light, then the laser light is received from substantially the center of the optical boresight.

Figure 4:
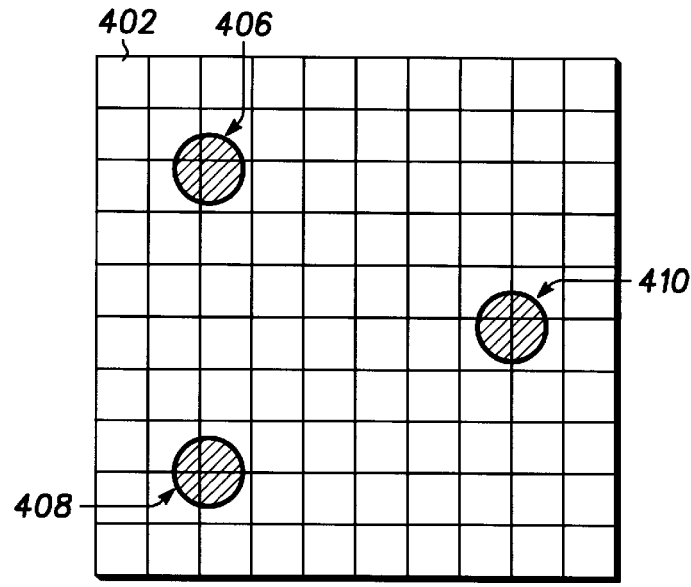
FIG. 4 shows an array of optical receivers in accordance with a preferred embodiment of the present invention.

FIG. 4 shows an array of optical receivers in accordance with a preferred embodiment of the present invention. Optical receiver array 400 is shown having 256 optical receivers 402, but more or less can be utilized without departing from the scope of the present invention. Shown superimposed on optical receiver array 400 are point source footprints 406, 408, and 410. In one embodiment, each of point source footprints 406, 408, and 410 correspond to a point source in the wide field of view. Each point source footprint can overlap with one or more of optical receivers 402. The location of point source footprints on optical receiver array 400 corresponds to the direction in the wide field of view from which the laser light is received. In one embodiment, an algorithm is used to determine the direction from which the laser light is received. The algorithm uses the identity of the individual receivers as independent variables, and it calculates the direction. In another embodiment, a lookup table is employed. The: lookup table includes entries for each optical receiver 402. From the lookup table, each optical receiver 402 can be mapped to a direction in the wide field of view.

Figure 5:
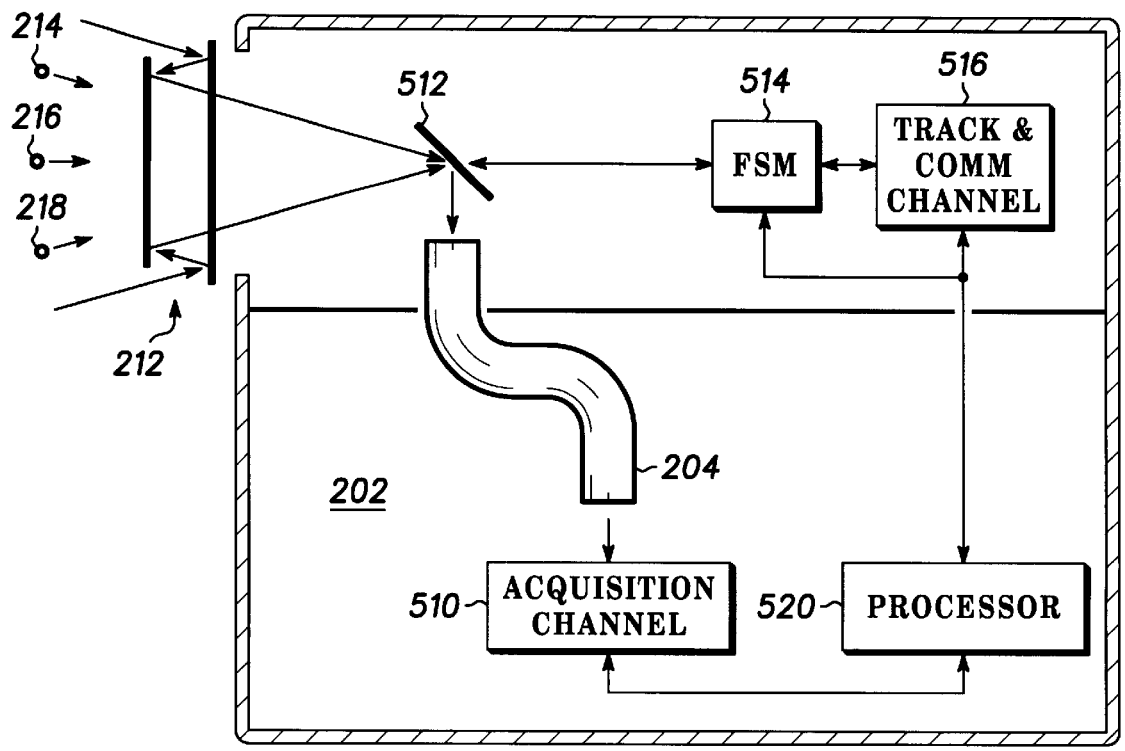
FIG. 5 shows a laser crosslink apparatus in accordance with a preferred embodiment of the present invention.

FIG. 5 shows a laser crosslink apparatus in accordance with a preferred embodiment of the present invention. Laser crosslink apparatus 500 includes optical device 212 and optical fiber bundle 204 as in the embodiment shown in FIG. 2. Laser crosslink apparatus 500 also includes beam splitter 512, fine steering mirror (FSM) 514, track and comm channel device 516, acquisition channel device 510 and processor 520.

Optical device 212 receives laser light from point sources, and it directs the light to beam splitter 512. Beam splitter 512 splits the laser light and directs it to two channels. The acquisition channel includes optical fiber bundle 204 and acquisition channel device 510, and the tracking and communication channel includes FSM 514 and track and comm channel device 516. The laser light is directed to optical fiber bundle 204 in the acquisition channel, and to FSM 514 in the tracking and communication channel.

In operation, the acquisition channel acquires the laser, and once acquired, the tracking and communication channel tracks the laser and communicates with the satellite from which the laser originates. The acquisition channel includes optical fiber bundle 204 and acquisition channel device 510. Acquisition channel device 510 includes an optical receiver array, such as optical receiver array 400 (FIG. 4). The optical receiver array can be any type of array capable of sensing laser light, such as a charge coupled device (CCD). Optical fiber bundle 204 receives an image from beam splitter 512, and it faithfully transfers that image to acquisition channel device 510. When distant point sources of laser light are within the wide field of view of optical device 212, they form discrete patterns that are preserved as they pass through optical fiber bundle 204. One example of point source footprints is shown in FIG. 4.

Acquisition channel device 510 communicates with processor 520 and allows processor 520 to determine which optical receivers are illuminated by the discrete point sources in the wide field of view of optical device 212. Using this information, processor 520 can determine the direction from which the laser light is received. Processor 520 can make this determination in many ways, including an algorithm or a lookup table. Processor 520 steers FSM 514 such that one of the point sources of laser light received by acquisition channel device 510 is centered on the tracking and communication channel device 516.

Once the tracking and communication channel has laser light substantially centered on tracking and communication channel device 516, the tracking and communication channel tracks the acquired satellite, and it communicates therewith. Tracking and communication channel device 516 can include a quadrant detector, such as quadrant detector 400 (FIG. 4) to track the acquired satellite. As the laser light moves away from the center of the quadrant detector, processor 520 can further steer FSM 514 to maintain the location of the laser light on tracking and communication channel device 516.

Laser crosslink device 500 is shown having a single fine steering mirror. In other embodiments, a fine steering mirror is included between beam splitter 512 and optical fiber bundle 204. In these embodiments, processor 520 also steers this additional fine steering mirror. In other embodiments, optical device 212 includes a gimbal, and processor 520 can point the gimbal in response to information received from acquisition channel device 510. In these embodiments, acquisition can be controlled by the gimbal, and tracking can be controlled by FSM 514.

The use of the dense optical fiber to separate optical components and electronic components results in greater design flexibility. For example, electronics can be dispersed throughout the satellite, for shielding purposes or weight distribution purposes. In addition, by relocating the optical receiver array, the volume, mass, power, and heat dissipation requirements of the devices exposed to radiation can be reduced.

Figure 6:
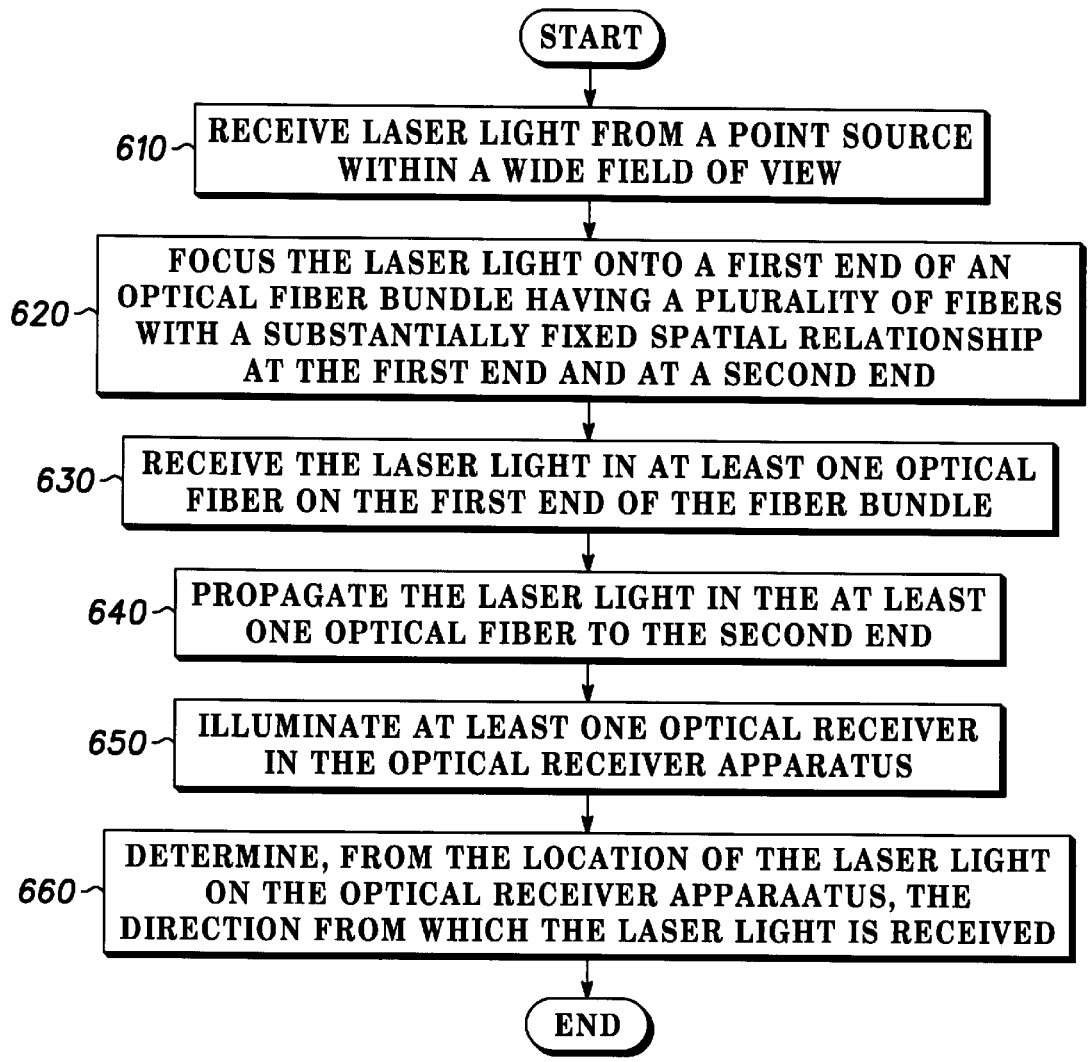
FIG. 6 is a flowchart of a method for determining the direction from which laser light is received in accordance with a preferred embodiment of the present invention.

FIG. 6 is a flowchart of a method for determining the direction from which laser light is received in accordance with a preferred embodiment of the present invention. Method 600 begins in action 610 when laser light is received from a point source within a wide field of view. The laser light can be received by an optical device that includes lenses, such as optical device 212 (FIG. 5). In action 620, the laser light is focused onto a first end of an optical fiber bundle having a plurality of fibers with a substantially fixed spatial relationship at the first end and at the second end. An example of the optical fiber bundle in action 620 is shown in FIG. 5 as optical fiber bundle 204.

In action 630 the laser light is received in at least one optical fiber on the first end of the fiber bundle. In embodiments where the fiber bundle is very high density, laser light received from a single point source can illuminate more than one optical fiber. When laser light is received from more than one point source, each footprint created can illuminate more than one optical fiber. Examples of these footprints are shown and described with reference to FIG. 4.

In action 640 the laser light is propagated in the at least one optical fiber to the second end of the optical fiber bundle, and in action 650, at least one optical receiver is illuminated in the optical receiver apparatus. An example of an optical receiver apparatus is the optical receiver array included within acquisition channel device 510 (FIG. 5). Another example of an optical receiver apparatus is the quadrant detector included within track and communication channel device 516.

In action 660, the location of the laser light on the optical receiver apparatus is used to determine the direction from which the laser light is received. For example, as shown in FIG. 5, processor 520 can utilize information from acquisition channel device 510 to determine the direction of any of point sources 214, 216, or 218 within the field of view of optical device 212.

The methods and apparatus of the present invention have been discussed primarily with respect to crosslinks in satellite communications systems. The methods and apparatus of the present invention are also applicable to terrestrial laser communications systems and networks. For example, a terrestrial laser system can advantageously utilize the methods and apparatus of the present invention to detect the location of a laser light source, and also to steer an outgoing laser. Also for example, the methods and apparatus of the present invention can be advantageously utilized in applications such as the tracking of laser light sources in industrial environments or other hazardous areas. By utilizing an optical fiber bundle to transfer the image to a remotely located optical receiver array, the array can be shielded from the hazardous environment, or located advantageously in the receiving/tracking system. Accordingly, the methods and apparatus of the present invention have wide applicability, and are not limited to space-born applications.

In summary, the methods and apparatus of the present invention provide a mechanism for generating an optical interconnect system having reduced alignment tolerances. While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An apparatus comprising:
   an optical device to receive laser light from a point source within a field of view;
   an optical fiber bundle having a first end and a second end, the first end being coupled to the optical device such that the laser light illuminates at least portion of the optical fiber bundle, wherein the illuminated portion of the optical fiber bundle correlates to a location of the point source within the field of view;
   an optical receiver array coupled to the second end of the optical fiber bundle and configured to determine which portion of the optical fiber bundle is the illuminated portion; and
   a processor coupled to the optical receiver array, wherein the processor is configured to determine a direction within the field of view from which the laser light is received as a function of the illuminated portion of the optical fiber bundle.

2. The apparatus of claim 1 wherein the optical fiber bundle includes a plurality of fibers having a substantially fixed spatial relationship at the fist end and at the second end.

3. The apparatus of claim 1 wherein the optical device includes at least one lens, and the first of the optical fiber bundle is positioned substantially at a focal plane of the at least one lens.

4. The apparatus of claim 1 further including a fine steering mirror responsive to the processor, the fine steering minor being configured to steer the laser light to substantially the center of the optical receiver array.

5. A satellite laser crosslink apparatus comprising:
   an optical fiber bundle configured to receive light from a point source within a field of view and to transmit the light through at least an illuminated portion of the optical fiber bundle, wherein the illuminated portion of the optical fiber bundle correlates to a location of the point source within the field of view;
   an optical receiver apparatus coupled to the optical fiber bundle to determine which portion of the optical fiber bundle is the illuminated portion; and a processor coupled to the optical receiver apparatus to determine a direction of the point source within the wide field of view as a function of the illuminated portion of the optical fiber bundle.

6. The satellite laser crosslink apparatus of claim 5 further comprising an optical device coupled to the optical fiber bundle, the optical device including at least one lens to focus the light on the optical fiber bundle.

7. The satellite laser crosslink apparatus of claim 6 wherein the optical device is located on an external surface of a satellite, the optical fiber bundle passes into an electromagnetic shielded portion of the satellite, and the optical receiver apparatus is located within the electromagnetic shielded portion of the satellite.

8. The satellite laser crosslink apparatus of claim 6 further comprising a fine steering mirror coupled to the processor, the fine steering mirror being configured to steer the light from the point source to substantially the center of the optical receiver apparatus.

9. The satellite laser crosslink apparatus of claim 5 wherein:
   the optical fiber bundle includes a first end and a second end;
   the optical fiber bundle is coupled to the optical device at the first end;
   the optical fiber bundle is coupled to the optical receiver apparatus at the second end; and
   the optical fiber bundle includes a plurality of fibers having a substantially fixed spatial relationship at the first end and at the second end.

10. A method of determining a direction from which laser light is received comprising:
    receiving the laser light from a point source wit a field of view;
    focusing the laser light onto an end of an optical fiber bundle such that at least a portion of the optical fiber bundle is illuminated, wherein the illuminated portion of the optical fiber bundle correlates to a location of the point source within the field of view;
    propagating the laser light through the optical fiber bundler to an optical receiver apparatus in a manner that preserves the illuminated portion of the optical fiber bundle; and
    determining the direction from which the laser light is received as a function of the illuminated portion of the optical fiber bundle.

11. The method of claim 10 wherein the laser light is received by a lens, and a first end of the optical fiber bundle is located in a focal plane of the lens such that the laser light is focused onto the first end of the optical fiber bundle.

12. The method of claim 11 wherein the optical fiber bundle includes a second end, and the optical fiber bundle includes a plurality of fibers having a substantially fixed spatial relationship at the first end and at the second end.

13. The method of claim 12 wherein propagating the light comprises:
    receiving the laser light in at lent one optical fiber on the first end of the optical fiber bundle;
    propagating the laser light in the at least one optical fiber to the second end; and
    illuminating at least one optical receiver in the optical receiver apparatus.

14. The method of claim 12 wherein the optical receiver apparatus comprises an array of optical receivers coupled to the second end of the optical fiber bundle, and determining the direction comprises:
    detecting the light using at least on optical receiver in the array of optical receivers; and
    mapping the at least one optical receiver to the direction.

* * * * *